United States Patent
Mizukami et al.

(10) Patent No.: US 9,887,645 B2
(45) Date of Patent: Feb. 6, 2018

(54) MOTOR DRIVE APPARATUS HAVING FUNCTION OF SUPPRESSING TEMPORAL VARIATION OF REGENERATIVE CURRENT

(71) Applicant: FANUC CORPORATION, Yamanashi (JP)

(72) Inventors: Shinichi Mizukami, Yamanashi (JP); Shigeki Hanyu, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 19 days.

(21) Appl. No.: 15/240,211

(22) Filed: Aug. 18, 2016

(65) Prior Publication Data

US 2017/0054404 A1    Feb. 23, 2017

(30) Foreign Application Priority Data

Aug. 21, 2015 (JP) ................. 2015-164056

(51) Int. Cl.
*H02P 27/08* (2006.01)
*H02P 3/18* (2006.01)
*H02M 7/219* (2006.01)

(52) U.S. Cl.
CPC .............. *H02P 3/18* (2013.01); *H02M 7/219* (2013.01); *H02P 27/085* (2013.01); *H02M 2007/2195* (2013.01)

(58) Field of Classification Search
CPC ....................................................... H02P 27/08
USPC ........................................ 318/376, 375, 362
See application file for complete search history.

(56) References Cited

U.S. PATENT DOCUMENTS 8,299,739 B2 * 10/2012 Kakebayashi .......... H02P 27/08
318/139
2013/0279241 A1 10/2013 De et al.

FOREIGN PATENT DOCUMENTS

| JP | 662584 A | 3/1994 |
|---|---|---|
| JP | 200594937 A | 4/2005 |
| JP | 2011254684 A | 12/2011 |

OTHER PUBLICATIONS

English Abstract and Machine Translation for Japanese Publication No. 06-062584 A, published Mar. 4, 1994, 16 pgs.

(Continued)

*Primary Examiner* — David S Luo
(74) *Attorney, Agent, or Firm* — Fredrikson & Byron, P.A.

(57) ABSTRACT

A motor drive apparatus comprises: a converter which converts DC power into AC power and returns the AC power to an AC power supply; a 120-degree conduction regenerative power control unit which controls the converter using a 120-degree conduction method so that the power recovered through the converter is returned to the AC power supply; a PWM regenerative power control unit which controls the converter using a PWM control method so that the power is returned to the AC power supply; an input voltage detection unit which detects a supply voltage supplied to the converter; a DC link voltage detection unit which detects a DC link voltage; and a regenerative method switching unit which, during power regeneration, performs switching between the 120-degree conduction method and the PWM control method in accordance with a given criterion, based on a voltage value detected by the DC link voltage detection unit.

2 Claims, 7 Drawing Sheets

(56) References Cited

OTHER PUBLICATIONS

English Abstract and Machine Translation for Japanese Publication No. 2011-254684 A, published Dec. 15, 2011, 11 pgs.
English Abstract and Machine Translation for Japanese Publication No. 2005-094937 A, published Apr. 7, 2005, 11 pgs.

* cited by examiner

PRIOR ART

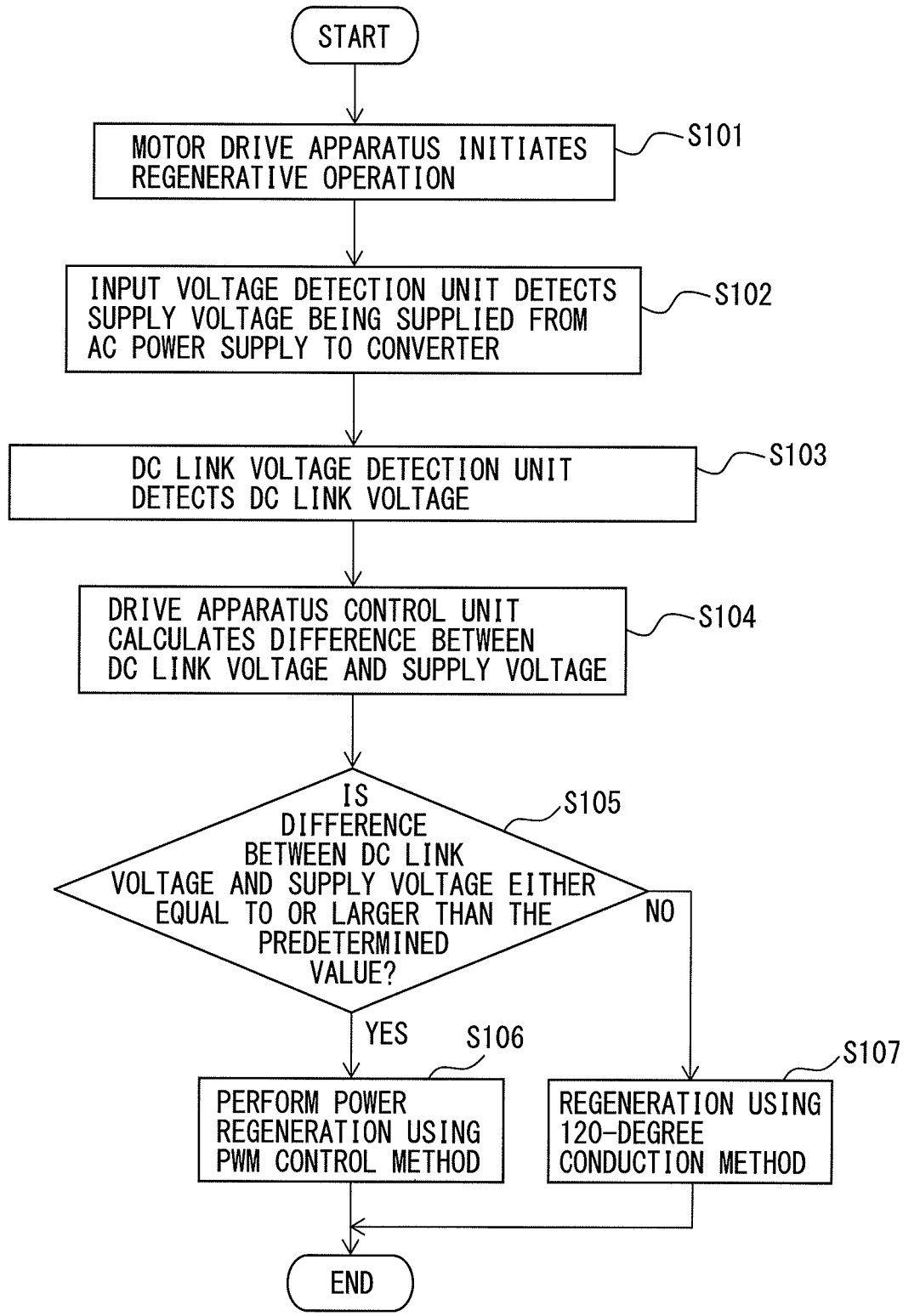

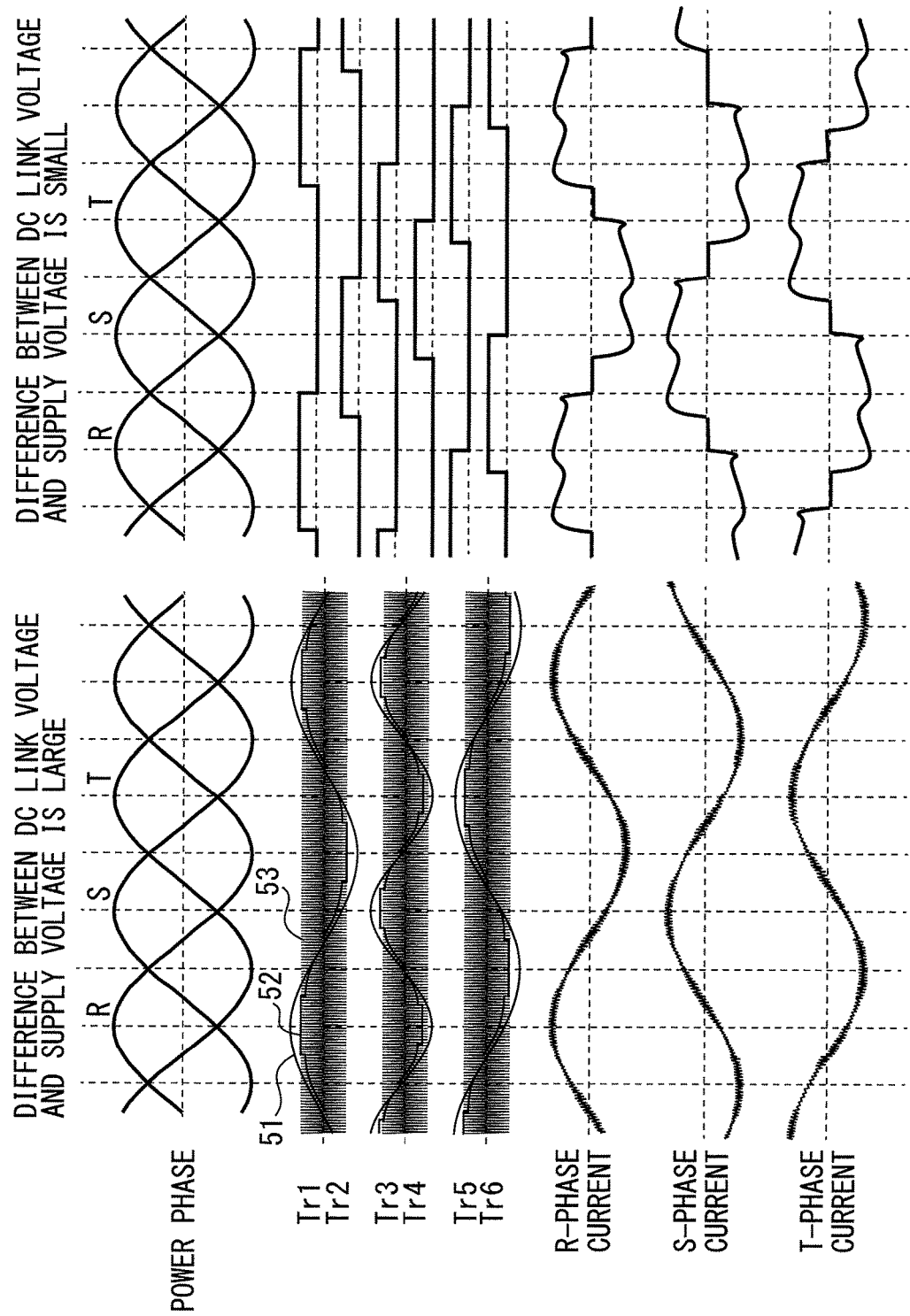

FIG. 6A  PHASE VOLTAGE
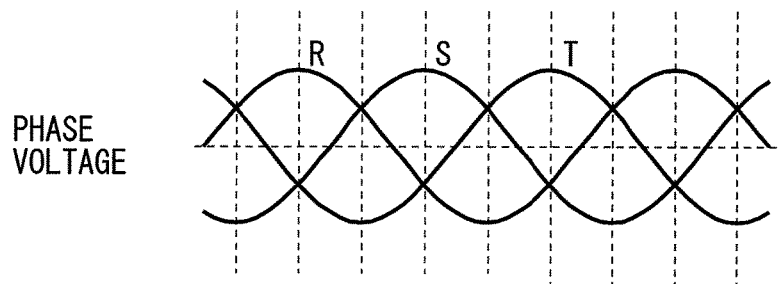
FIG. 6B  PHASE CURRENT ACCORDING TO CONVENTIONAL ART
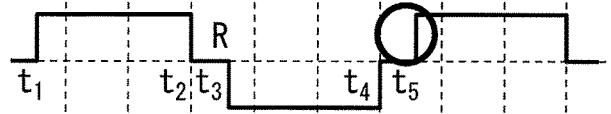
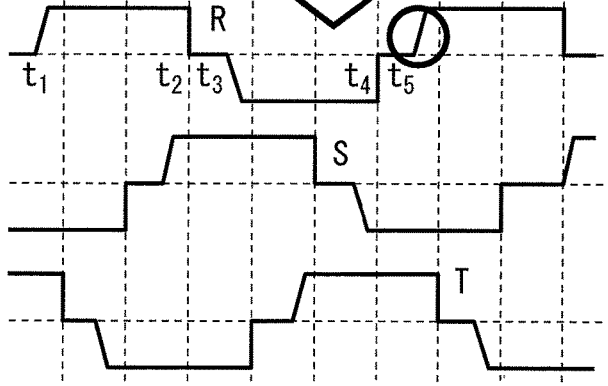
FIG. 6C  PHASE CURRENT ACCORDING TO NEW CONTROL METHOD

MOTOR DRIVE APPARATUS HAVING FUNCTION OF SUPPRESSING TEMPORAL VARIATION OF REGENERATIVE CURRENT

BACKGROUND OF THE INVENTION

1. Field of the Invention

The present invention relates to a motor drive apparatus, and in particular to a motor drive apparatus having the function of suppressing the temporal variation of regenerative current.

2. Description of the Related Art

During deceleration of a motor, the motor acts to provide regenerative braking. Power regeneration is a known method of handling power when regenerative power is large (for example, refer to Japanese Unexamined Patent Publication No. H06-062584). A converter used for power regeneration is shown in FIG. 1. The converter 1001 used for power regeneration comprises power devices Tr1 to Tr6 as transistors each of which is connected in parallel with one of diodes D1 to D6. Power generated by a motor is fed to charge a smoothing capacitor (not shown) provided between terminals 1003 and 1004, and the power stored on the smoothing capacitor is inversely converted by the converter 1001 and returned to a power supply 1002. Known methods for controlling the power regeneration converter 1001 include a PWM control method and a 120-degree conduction method. In the PWM control method, regenerative current can be made to have a sinusoidal waveform, and the amount of its temporal variation can be controlled. However, the switching noise increases with the PWM operation, and the cost increases as a result of adding a filter or the like. Accordingly, the 120-degree conduction method is generally preferred for use.

The 120-degree conduction method is a method that detects the phase of the supply voltage and that returns the regenerative power to the power supply only during the 120-degree period in which the potential difference of the supply voltage is large. FIGS. 2A and 2B show a temporal variation of power phase, timing charts illustrating the ON/OFF operations of the power devices Tr1 to Tr6, and temporal variations of R-phase, S-phase, and T-phase currents when the 120-degree conduction method is used. FIG. 2A shows the case when the difference between DC link voltage and supply voltage is large and FIG. 2B shows the case when the difference between DC link voltage and supply voltage is small.

As shown in FIG. 2A, when the difference between DC link voltage and supply voltage is large, periods (indicated by hatching) are provided during each of which switching is performed at a given frequency to control the current so as not to exceed a given peak current. In this case, di/dt (the amount of temporal variation of current) is calculated in accordance with the following equation (1), and inrush current is calculated by multiplying di/dt with time.

$$\frac{di}{dt} = \frac{\left(V_{DC} - \frac{V_{IN}}{\sqrt{3}}\right)}{L}$$

where $V_{DC}$ is the DC link voltage, $V_{IN}$ is the supply voltage, and L is the inductance of AC reactor and power supply.

In the conventional art, when the difference between the DC link voltage and the supply voltage (DC link voltage-supply voltage) is large, inrush current occurs during power regeneration, as in the R-phase current at time $t_1$ shown in FIG. 2A. Accordingly, if the power devices are to be protected in the conventional art regenerative method, di/dt must be suppressed by increasing the inductance L of the AC reactor. In the case of the PWM control method, the occurrence of inrush current can be suppressed without increasing the inductance of the AC reactor, but there in turn is the problem that the temperature of the power devices increases.

SUMMARY OF THE INVENTION

It is an object of the present invention to provide a motor drive apparatus wherein provisions are made to suppress the occurrence of inrush current as well as the temperature rise of driving devices, while at the same time, achieving a reduction in cost by reducing the size of the AC reactor.

According to one embodiment of the present invention, there is provided a motor drive apparatus comprising: a converter configured to convert DC power into AC power and returns the AC power to an AC power supply; a 120-degree conduction regenerative power control unit configured to control the converter using a 120-degree conduction method so that the power recovered through the converter is returned to the AC power supply; a PWM regenerative power control unit configured to control the converter using a PWM control method so that the power recovered through the converter is returned to the AC power supply; an input voltage detection unit configured to detect a supply voltage being supplied from the AC power supply to the converter; a DC link voltage detection unit configured to detect a DC link voltage which is an output voltage of the converter; and a regenerative method switching unit configured to, during power regeneration, perform switching between the 120-degree conduction method and the PWM control method in accordance with a given criterion, based on a voltage value detected by the DC link voltage detection unit.

BRIEF DESCRIPTION OF THE DRAWINGS

The above and other objects, features, and advantages of the present invention will become more apparent from the description of the preferred embodiments as set forth below with reference to the accompanying drawings, wherein:

FIG. 4 is a flowchart for explaining the sequence of operations performed by the motor drive apparatus according to the embodiment of the present invention;

FIG. 5A is a diagram showing a temporal variation of power phase, timing charts illustrating the ON/OFF operations of power devices, and temporal variations of R-phase, S-phase, and T-phase currents when the difference between DC link voltage and supply voltage is large in the motor drive apparatus according to the embodiment of the present invention;

FIG. 5B is a diagram showing a temporal variation of power phase, timing charts illustrating the ON/OFF operations of power devices, and temporal variations of R-phase, S-phase, and T-phase currents when the difference between DC link voltage and supply voltage is small in the motor drive apparatus according to the embodiment of the present invention;

FIG. 6A is a diagram showing a temporal variation of phase voltage;

FIG. 6B is a diagram showing a temporal variation of phase current according to the conventional art;

FIG. 6C is a diagram showing a temporal variation of phase current in the motor drive apparatus according to the embodiment of the present invention;

DETAILED DESCRIPTION

Motor drive apparatus according to the present invention will be described below with reference to the drawings.

Figure 1:
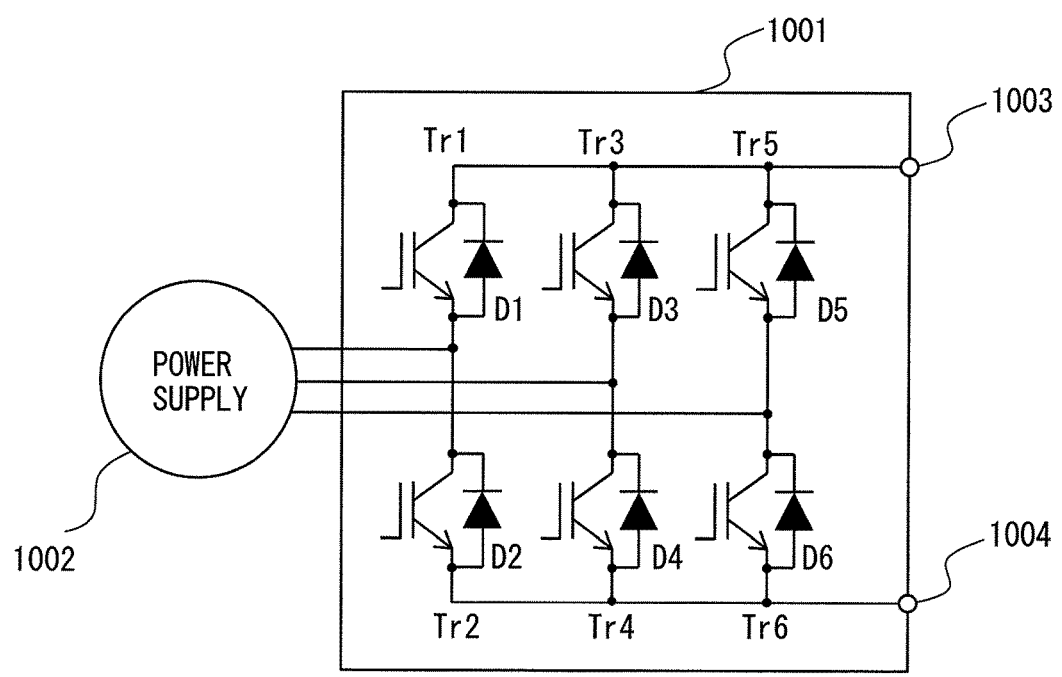
FIG. 1 is a diagram showing the configuration of a converter according to the conventional art.
Figure 2:
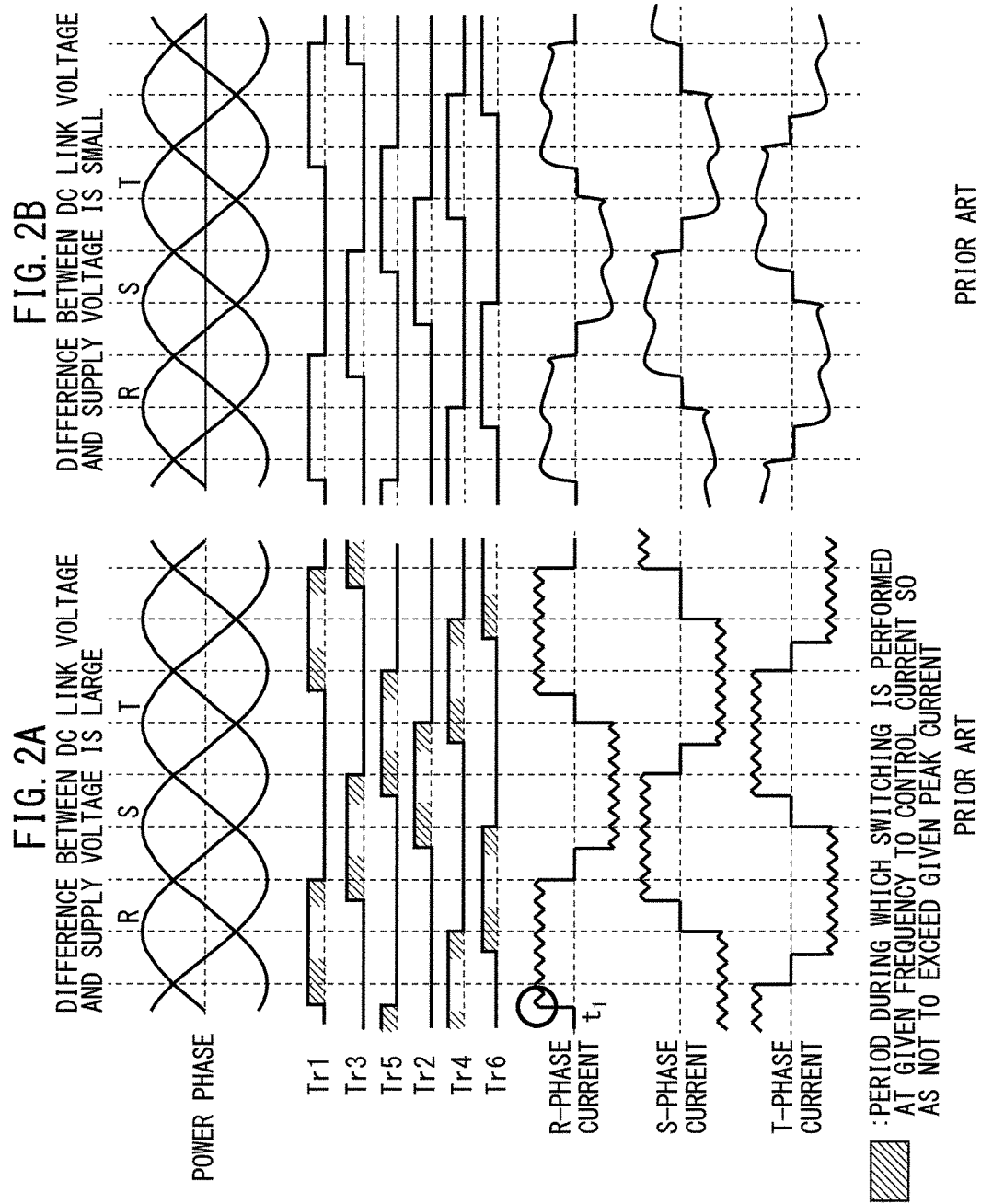
FIG. 2A is a diagram showing a temporal variation of power phase, timing charts illustrating the ON/OFF operations of power devices, and temporal variations of R-phase, S-phase, and T-phase currents when the difference between DC link voltage and supply voltage is large in a converter that uses a 120-degree conduction method according to the conventional art.
FIG. 2B is a diagram showing a temporal variation of power phase, timing charts illustrating the ON/OFF operations of power devices, and temporal variations of R-phase, S-phase, and T-phase currents when the difference between DC link voltage and supply voltage is small in the converter that uses the 120-degree conduction method according to the conventional art.
Figure 3:
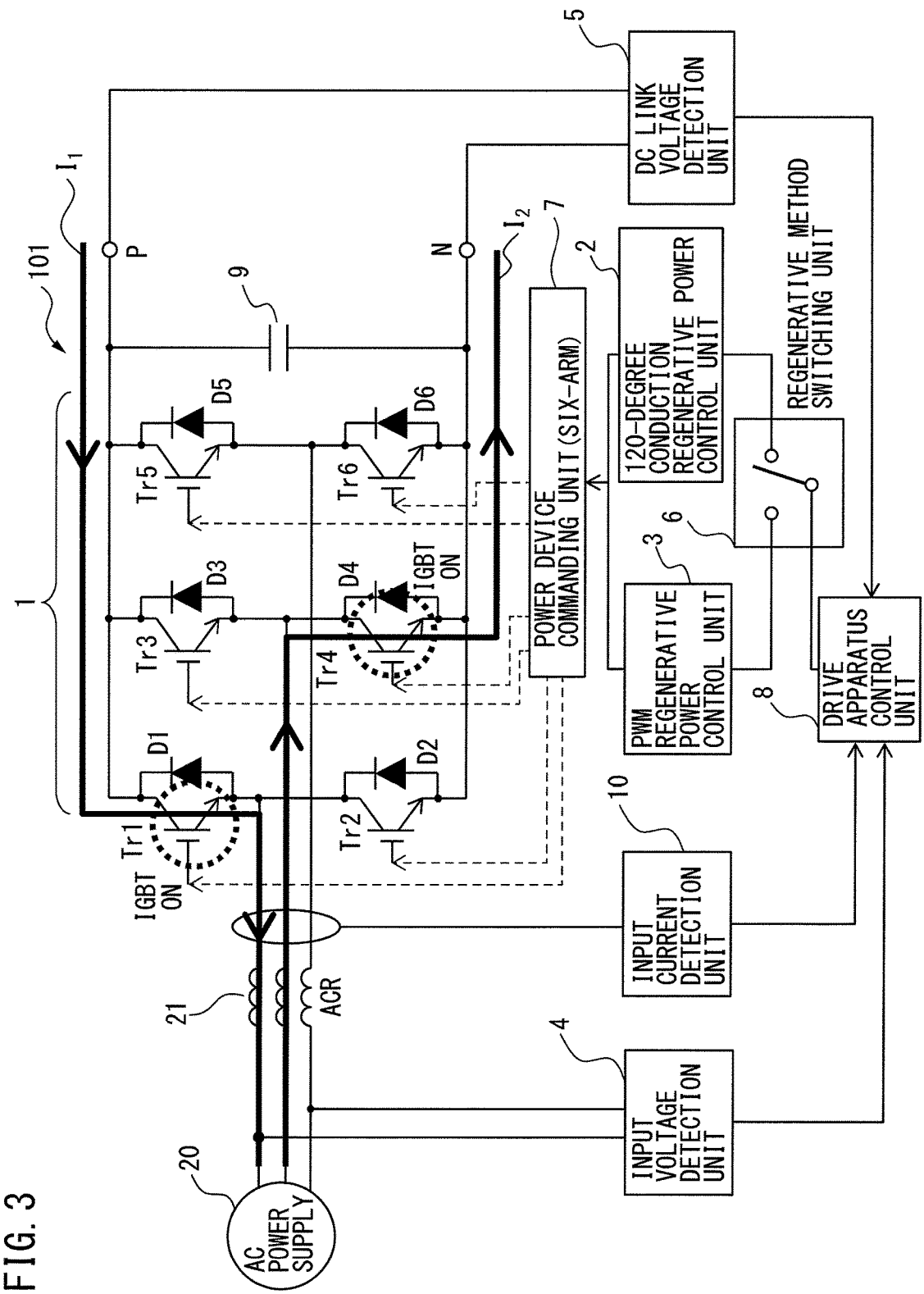
FIG. 3 is a diagram showing the configuration of a motor drive apparatus according to an embodiment of the present invention.

FIG. 3 shows the configuration of a motor drive apparatus according to an embodiment of the present invention. The motor drive apparatus 101 according to the embodiment of the present invention includes a converter 1, a 120-degree conduction regenerative power control unit 2, a PWM regenerative power control unit 3, an input voltage detection unit 4, a DC link voltage detection unit 5, and a regenerative method switching unit 6.

The converter 1 comprises power devices Tr1 to Tr6 and diodes D1 to D6, and converts DC power stored on a smoothing capacitor 9 into AC power and returns the thus recovered AC power to an AC power supply 20. The ON/OFF operations of the power devices Tr1 to Tr6 are controlled by signals applied from a power device commanding unit 7 to the gates of the respective power devices Tr1 to Tr6. An AC reactor (ACR) 21 is provided between the converter 1 and the AC power supply 20.

The 120-degree conduction regenerative power control unit 2 controls the converter 1 using a 120-degree conduction method so that the regenerative power recovered through the converter 1 is returned to the AC power supply 20. More specifically, the 120-degree conduction regenerative power control unit 2 sends a command for performing power regeneration using the 120-degree conduction method to the power device commanding unit 7.

The PWM regenerative power control unit 3 controls the converter 1 using a PWM control method so that the regenerative power recovered through the converter 1 is returned to the AC power supply 20. More specifically, the PWM regenerative power control unit 3 sends a command for performing power regeneration using the PWM control method to the power device commanding unit 7.

The input voltage detection unit 4 detects the supply voltage being supplied from the AC power supply 20 to the converter 1. The value of the supply voltage detected by the input voltage detection unit 4 is sent to a drive apparatus control unit 8.

The DC link voltage detection unit 5 detects the DC link voltage which is an output voltage of the converter 1. The smoothing capacitor 9 is provided at the output of the converter 1. The DC link voltage is the voltage appearing between the terminals N and P of the smoothing capacitor 9. The value of the DC link voltage detected by the DC link voltage detection unit 5 is sent to the drive apparatus control unit 8.

The drive apparatus control unit 8 calculates the difference between the acquired DC link voltage and supply voltage, and determines whether or not the calculated difference is equal to or larger than a predetermined value stored in advance. The result of the determination is sent to the regenerative method switching unit 6.

During power regeneration, the regenerative method switching unit 6 performs switching between the 120-degree conduction method and the PWM control method in accordance with a given criterion, based on the voltage value detected by the DC link voltage detection unit 5. The regenerative method switching unit 6 may perform switching to select the PWM control method when the difference between the DC link voltage and the supply voltage is equal to or larger than the predetermined value and to select the 120-degree conduction method when the difference between the DC link voltage and the supply voltage is smaller than the predetermined value.

An input current detection unit 10 for detecting the current being supplied from the AC power supply 20 to the converter 1 is also provided. The input current detection unit 10 also detects the current that flows when the motor drive apparatus 101 performs regenerative operation. For example, in FIG. 3, when the power devices Tr1 and Tr4 are ON, and the other power devices are OFF, the current $I_1$ flowing from the converter 1 to the AC power supply 20 and the current $I_2$ flowing from the AC power supply 20 to the converter 1 can be detected. Next, the sequence of operations performed by the motor drive apparatus according to the embodiment of the present invention will be described with reference to the flowchart shown in FIG. 4. First, in step S101, the motor drive apparatus 101 initiates regenerative operation.

Next, in step S102, the input voltage detection unit 4 detects the supply voltage being supplied from the AC power supply 20 to the converter 1.

In step S103, the DC link voltage detection unit 5 detects the DC link voltage.

In step S104, the drive apparatus control unit 8 calculates the difference between the DC link voltage and the supply voltage.

In step S105, the drive apparatus control unit 8 determines whether or not the difference between the DC link voltage and the supply voltage is equal to or larger than the predetermined value.

When the difference between the DC link voltage and the supply voltage is equal to or larger than the predetermined value, then in step S106 the regenerative method switching unit 6 selects the PWM regenerative power control unit 3 so that the power regeneration is performed using the PWM control method.

FIG. 5A shows a temporal variation of power phase, timing charts illustrating the ON/OFF operations of the power devices, and temporal variations of the R-phase, S-phase, and T-phase currents when the difference between the DC link voltage and the supply voltage is equal to or larger than the predetermined value. The switching control for the power devices Tr1 to Tr6 shown in FIG. 5A will be described. In FIG. 5A, reference numeral 51 is the supply voltage detected, and 52 is the PWM command (one example). Further, 53 is the PWM carrier wave (carrier) as a triangular wave for generating the PWM signal. In the power regeneration using the PWM control method, a comparison is made between the PWM command 52 and the PWM carrier 53, and when the PWM voltage command 52 is larger, the power device Tr1 is turned off, and the power device Tr2 is turned on. Conversely, when the PWM voltage command 52 is smaller than the PWM carrier 53, the power device Tr1 is turned on, and the power device Tr2 is turned off. The power devices Tr3 and Tr4 and the power devices Tr5 and Tr6 are controlled in a similar manner.

By controlling the power devices Tr1 to Tr6 as described above, the current flowing in each of the R phase, S phase, and T phase can be made to have a sinusoidal waveform, as shown in FIG. 5A. The occurrence of inrush current can be suppressed by performing the power regeneration using the PWM control method, as will be described later.

On the other hand, when the difference between the DC link voltage and the supply voltage is smaller than the predetermined value, then in step S107 the regenerative method switching unit 6 selects the 120-degree conduction regenerative power control unit 2 so that the power regeneration is performed using the 120-degree conduction method.

FIG. 5B shows a temporal variation of power phase, timing charts illustrating the ON/OFF operations of the power devices, and temporal variations of the R-phase, S-phase, and T-phase currents when the difference between the DC link voltage and the supply voltage is smaller than the predetermined value. In this case, the temperature rise of the power devices which would occur if the PWM control method were used can be suppressed by performing the power regeneration using the 120-degree conduction method.

As has been described above, according to the motor drive apparatus of the present invention, since the occurrence of inrush current can be suppressed by performing the power regeneration using the PWM control method, the size of the AC reactor can be reduced. Further, when the inrush current is relatively small, the temperature rise of the power devices is suppressed by performing the power regeneration using the 120-degree conduction method.

In the above embodiment, the temperature rise may be suppressed by making provisions so that the switching of the regenerative method based on the difference between the DC link voltage and the supply voltage is performed only during the early stage of the regeneration when the potential difference is large.

Figure 7A:
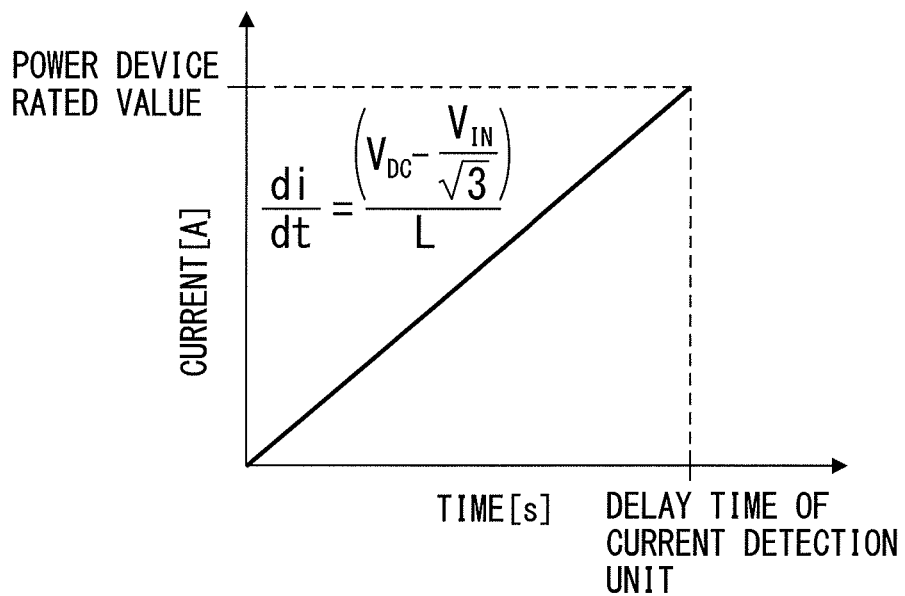
FIG. 7A is a diagram showing a temporal variation of phase current according to the conventional art.
Figure 7B:
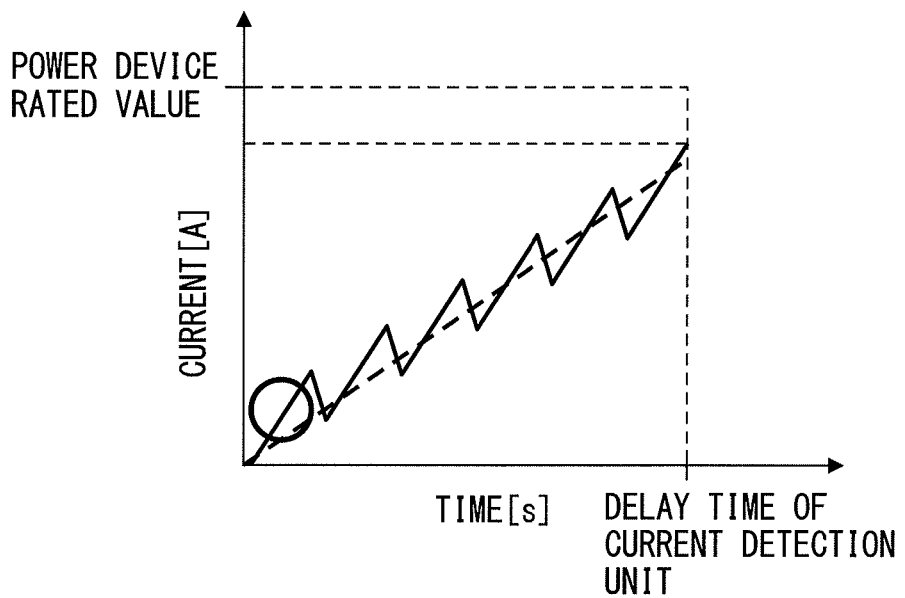
FIG. 7B is a diagram showing a temporal variation of phase current in the motor drive apparatus according to the embodiment of the present invention.

Next, a description will be given of how the slope of the current can be suppressed in accordance with the motor drive apparatus according to the embodiment of the present invention. FIG. 6A shows the temporal variation of the phase voltage. FIG. 6B shows the temporal variation of the phase current according to the conventional art. FIG. 6C shows the temporal variation of the phase current in the motor drive apparatus according to the embodiment of the present invention. The variation of the R-phase current at time $t_5$ in FIGS. 6B and 6C is shown in enlarged form in FIGS. 7A and 7B, respectively. In the conventional art, the slope of the current depends on the inductance L of the reactor and the difference voltage between the DC link voltage and the supply voltage. As a result, the peak current has had to be suppressed so that the current that increases during the delay time of the current detection circuit does not exceed the power device rated value.

On the other hand, in the motor drive apparatus according to the embodiment of the present invention, the slope of the current is controlled by the inductance L of the reactor, the difference voltage between the DC link voltage and the supply voltage, and the switching frequency. In the present invention, since the slope of the inrush current can be controlled as desired by the switching frequency, the current that increases during the delay time of the current detection circuit can be reduced to a value sufficiently smaller than the power device rated value. In this way, since the occurrence of inrush current can be suppressed according to the motor drive apparatus of the present invention, the inductance L can be reduced, and thus the size of the AC reactor can be reduced.

Further, as shown in FIG. 6C, in the present invention, control is performed by the switching frequency of the R-phase current at times $t_1$, $t_3$, and $t_5$, but not performed at times $t_2$ and $t_4$. That is, the control based on the switching frequency of the phase current is not performed at every timing, but the switch method is switched at desired timing according to the voltage phase. For example, the occurrence of inrush current can be suppressed by performing the power regeneration using the PWM control method only when the difference between the DC link voltage and the supply voltage is equal to or larger than the predetermined value; on the other hand, when the difference between the DC link voltage and the supply voltage is smaller than the predetermined value, the temperature rise of the power devices can be suppressed by performing the power regeneration using the 120-degree conduction method.

According to the motor drive apparatus in the embodiment of the present invention, not only can the occurrence of inrush current and the temperature rise of the driving devices be suppressed, but the cost can also be reduced by reducing the size of the AC reactor.

The invention claimed is:
1. A motor drive apparatus comprising:
a converter configured to convert DC power into AC power and returns the AC power to an AC power supply;
a 120-degree conduction regenerative power control unit configured to control the converter using a 120-degree conduction method so that the power recovered through the converter is returned to the AC power supply;
a PWM regenerative power control unit configured to control the converter using a PWM control method so that the power recovered through the converter is returned to the AC power supply;
an input voltage detection unit configured to detect a supply voltage being supplied from the AC power supply to the converter;
a DC link voltage detection unit configured to detect a DC link voltage which is an output voltage of the converter; and
a regenerative method switching unit configured to, during power regeneration, perform switching between the 120-degree conduction method and the PWM control method in accordance with a given criterion, based on a voltage value detected by the DC link voltage detection unit.

2. The motor drive apparatus according to claim 1, wherein the regenerative method switching unit performs switching to select the PWM control method when the difference between the DC link voltage and the supply voltage is equal to or larger than a predetermined value and to select the 120-degree conduction method when the difference between the DC link voltage and the supply voltage is smaller than the predetermined value.

\* \* \* \* \*